Figure 1:
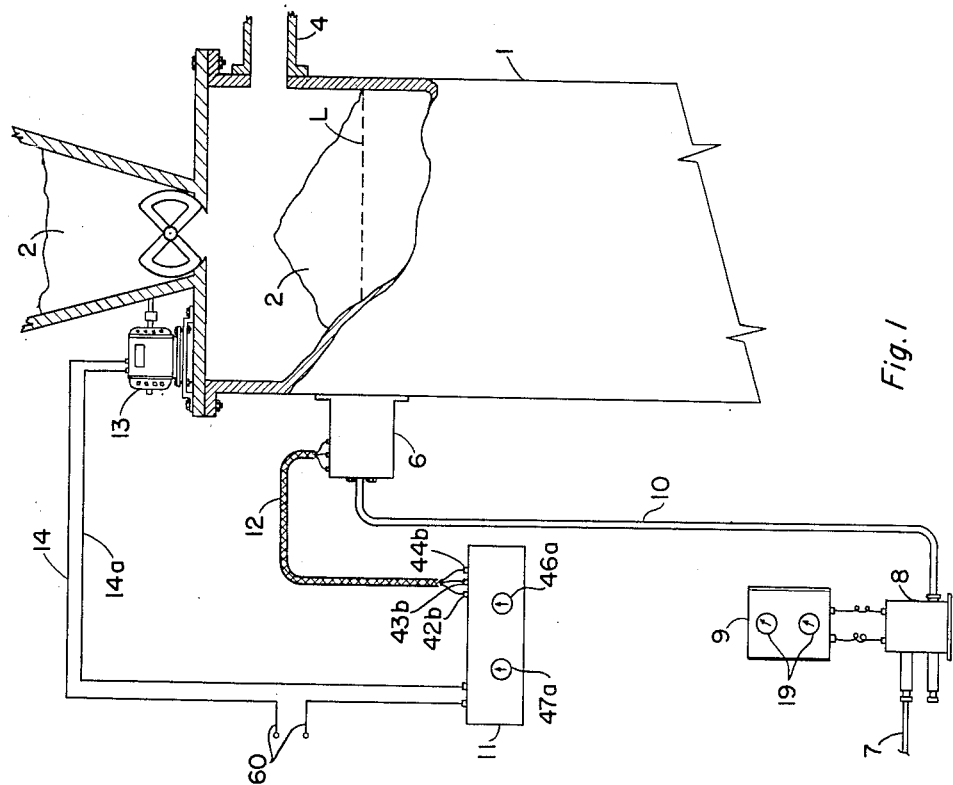

Dec. 9, 1952   J. D. LANKFORD ET AL   2,620,933
SOLIDS LEVEL CONTROL
Filed Jan. 8, 1951                                     2 SHEETS—SHEET 1

INVENTORS
Jonathan D. Lankford
Fred J. Trotter
Fred W. Taylor
BY Donald G. Leech
ATTORNEY

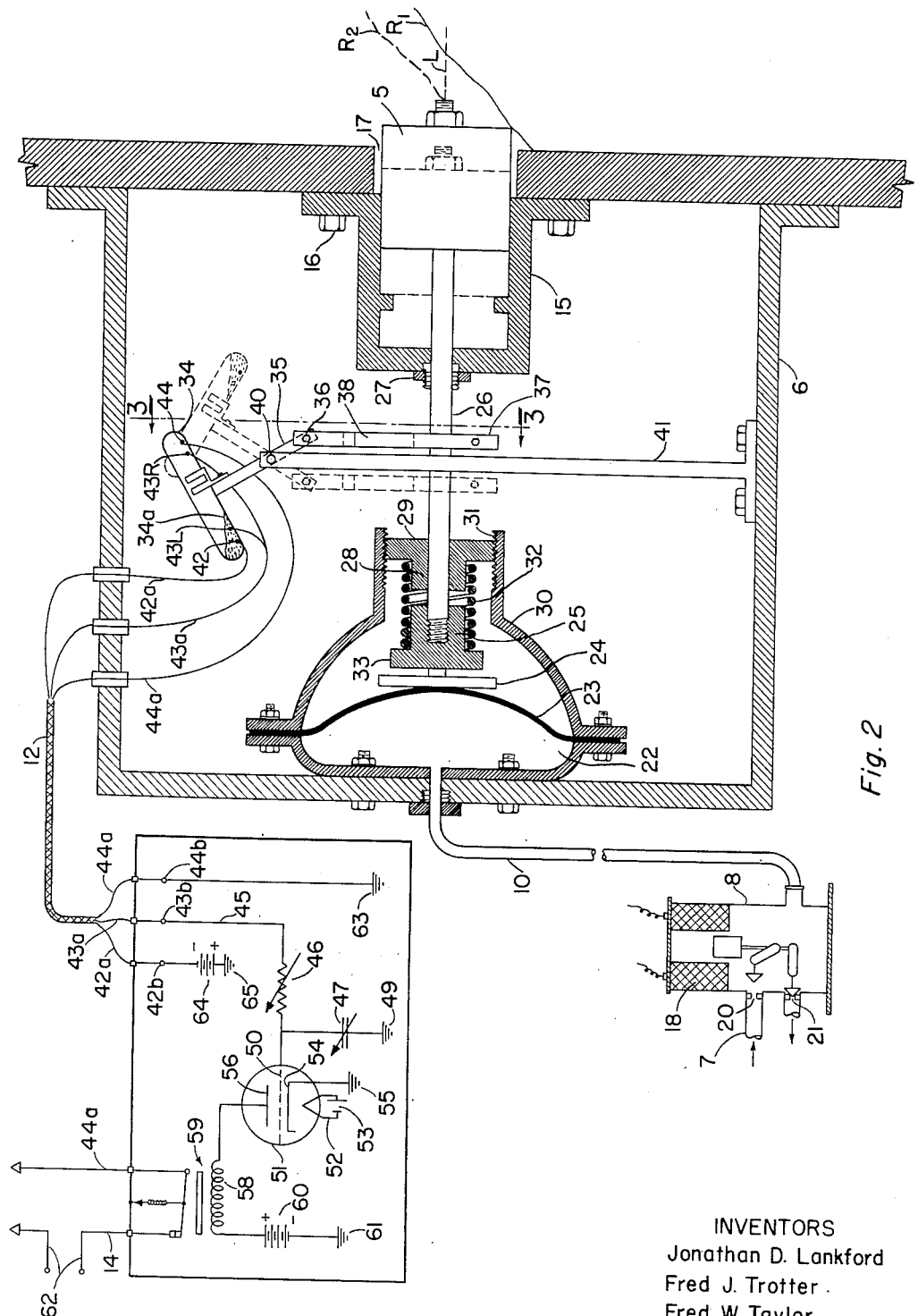

Patented Dec. 9, 1952

2,620,933

UNITED STATES PATENT OFFICE 2,620,933

SOLIDS LEVEL CONTROL

Jonathan D. Lankford, Fred J. Trotter, and Fred W. Taylor, Rifle, Colo., assignors to the United States of America as represented by the Secretary of the Interior Application January 8, 1951, Serial No. 204,921

13 Claims. (Cl. 214—18.2)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention is concerned with a device and a method for maintaining a predetermined level of particulate solid material within a container.

In the handling of particulate solid material, for example, in the storing or processing of such material, it is often necessary or desirable to maintain a constant level of solids within a container from which the solids are continuously or intermittently withdrawn. Maintaining the necessary control over the solids level is often a difficult problem particularly where the solids being handled are made up of coarse and irregularly sized particles which have poor properties of flow. Likewise, in the processing of particulate solids, the processing conditions often aggravate the problem of control. The problems encountered in the retorting of oil shale to produce liquid hydrocarbons is an illustration of a particularly difficult situation involving the necessity for controlling the solids level. To insure efficient conditions for retorting, it is usually necessary to maintain the level of crushed oil shale in the retort within rather close limits. Since the particles of crushed shale are coarse and irregular in size (ranging from about ¼ to 2 inches) and since the temperature in the retort is quite high (for example, from 800° to 1200° F.) the problem of controlling the crushed shale level within the retort is quite difficult.

Prior methods and devices for controlling or indicating the level of particulate solids within a container suffer from a number of disadvantages, which in many instances makes them entirely unsuitable. Indicating or control devices such as diaphragms, for example, which operate in response to the pressure exerted by the solids on the walls of the container are not rugged enough to withstand severe operating conditions such as extremely high temperatures. Float devices are often undependable particularly when coarse and irregularly-sized particles are being handled since these tend to become buried in the mass of the solids instead of floating on the surface thereof. Similarly, the lack of flexibility and adaptability to various types of solids often make these and other prior devices undesirable for many uses.

An object of the invention is to provide a device and a method for maintaining a predetermined level of particulate solid material in a container which operates efficiently under the most severe operating conditions.

It is a further object of the invention to provide a device and a method for controlling the level of particulate solids which is dependable in operation regardless of the type of solids being handled.

Another object of the invention is to provide a device and a method for controlling the level of solids in a container which may be operated to control the solids level within wide or narrow limits as desired and which can be adapted to solids of any density or particle size distribution.

Additional objects of the invention will become apparent from a consideration of the subsequent description together with the accompanying drawings.

The present invention for accomplishing the foregoing objects involves the use of a piston located at a point adjacent the solids level which is to be maintained. Over comparatively short time intervals, the piston is periodically urged forward into the container space and then withdrawn therefrom. As the piston moves back and forth, in and out of the container space, it feels, so to speak, for the solids level in the container. As long as the solids level is below the piston, it continues to operate back and forth within a fixed period of time. The forward thrust of the piston is so adjusted that when the solids level rises above the level of the piston, entry of the piston into the container space is hindered and the periodic reciprocation of the piston is thereby stopped. Timing means are provided to detect the failure of the piston to continue its reciprocation. After a lapse of a predetermined time interval, longer than the time required for the piston to complete at least one reciprocation, the timing means may give a signal indicating that the solids level has risen above the piston, or may automatically control the operation of means for adjusting the solids level, for example, by discontinuing the feed of additional solids into the container, or by starting the discharge of solids therefrom.

Figure 3:
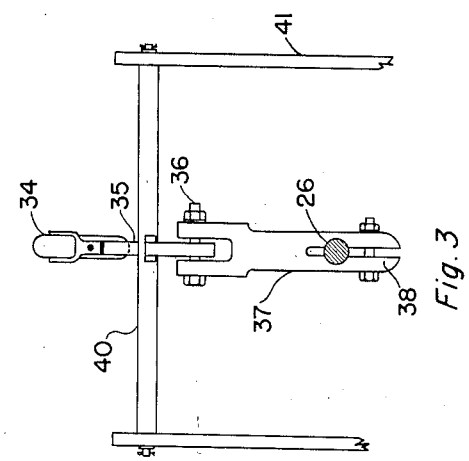

For better understanding of the invention, reference is now made to the accompanying drawings in which Fig. 1 is a semidiagrammatic view showing one particular embodiment of the invention in operative relationship with a container adapted for use in processing particulate solid materials such as crushed oil shale; and Fig. 2 is a view partly in section showing in detail some of the more important elements of the device illustrated in Fig. 1; and Fig. 3 is a view taken on the line 3—3 of Fig. 2.

Referring now to Fig. 1, the reference numeral 1 refers to a container for holding particulate solid material 2, such as crushed oil shale. Assuming that the particulate solid material 2 is to be processed continuously, as in the case of retorting oil shale to produce liquid hydrocarbons, the material to be processed is introduced at the top of the container by the feeder 3 and the finished processed material withdrawn from the bottom of the container by means not shown. Gaseous products evolved during the processing, for example, hydrocarbon vapors in the case of retorting of oil shale, are withdrawn at the top of the container through conduit 4. Assuming that it is desired to maintain the solids in container 1 at a predetermined level designated by the dotted line L, a reciprocating piston 5 (see Fig. 2) is provided at a point adjacent the predetermined level L. Housing 6 surrounding the piston and its operating mechanism is attached to the outer wall of the container 1. Compressed air, supplied by line 7, is conducted through valve 8 and line 10 to the mechanism for operating the piston 5. As will appear in more detail from the subsequent description, valve 8 is a solenoid operated valve which is controlled by the timing device 9, for periodically admitting compressed air into and releasing compressed air from, the mechanism which operates the piston.

An electronic timing device 11 is connected, by means of cable 12, to a switch controlled by piston 5 in a manner to be subsequently described. Through the appropriate setting of the time delay variables of the electronic timing device 11, the failure of the piston to execute its periodic reciprocations is detected whereupon the timing device 11 automatically breaks the circuit supplying power by way of leads 14 and 14a to the motor 13 which operates the feeder 3, thereby cutting off the feed of solid material to the container.

Referring now to Fig. 2, it will be seen that the piston 5 slides in a housing 15 fastened to an outside wall of the container by the bolts 16. The piston 5, together with the piston housing 15, are disposed opposite an opening 17 in a wall of the container so that as the piston moves forward and backward it enters, and is withdrawn from, the container space.

In the embodiment shown, the piston is driven by means of compressed air. The compressed air is supplied by way of line 7 to the 3-way solenoid operated valve 8. The timing device 9 (see Fig. 1) is provided to periodically energize and deenergize the solenoid coil 18. The device 9, for accomplishing this may be of any suitable construction and is preferably provided with controls 19 for varying the time intervals between the periodic energization and de-energization of the solenoid coil 18.

As shown in Fig. 2, the solenoid 18 has been de-energized, causing the upper portion 20 of the valve 8 to open for the admission of compressed air, and causing the lower or vent portion 21 of the valve 8 to close. The compressed air flows by way of line 10 to the diaphragm chamber 22 exerting a force against the diaphragm 23. Movement of the diaphragm 23 is communicated to the diaphragm button 24 and to the boss 25 to which the diaphragm button is attached.

Piston rod 26, rigidly attached at one end to boss 25, and at the opposite end to the piston 5, is slidably mounted in a bushing 27 carried by piston housing 15 and in a second bushing 28, having a flange 29. Flange 29 is threaded at its periphery and screws into the open end of diaphragm housing 30, internally threaded as at 31.

To return the piston to its original position after the pressure is released from the chamber 22, a coil spring 32 is provided held in compression between flange 29 and a shoulder 33 on boss 25. The tension on the spring 32 may be adjusted by screwing the flanged bushing 28 inwardly or outwardly along the axis of the diaphragm housing 30.

Above the piston rod 26, a mercury switch 34 is mounted rigidly on a swinging arm 35. The opposite end of arm 35 is pivotally connected at 36 to an upright post 37 rigidly connected at 38 to the piston rod 26 for movement therewith. The arm 35 likewise slides in a slot 39 provided in a bar 40 rotatably mounted on supports 41 (see Fig. 3). By virtue of this system of linkages, the arm 35 carrying the mercury switch 34 changes its position as the piston travels back and forth, assuming the position shown in dotted lines when the piston is in a completely withdrawn position.

Mercury switch 34 is provided with four terminals: 42, 43L, 43R, and 44. To terminals 42 and 44 are attached leads 42a and 44a, respectively. A single lead 43a, is attached to the terminals 43L and 43R. Leads 42a, 43a, and 44a are attached at their opposite ends to terminals 42b, 43b, and 44b, respectively, of the electronic timer 11.

The middle terminal 43b of the electronic timer is connected by lead 45 to a variable resistance 46, which in turn, is connected to a variable condenser 47, grounded at 49, and to the grid 50 of a sharp cut-off amplifier tube 51. The tube 51 is provided with a filament 52 heated from a source 53. The cathode 54 is grounded as at 55. The plate 56 is connected by lead 57 to the coil 58 of relay 59. The opposite end of the relay coil 58 is connected to the positive terminal of the battery 60, grounded at 61, which furnishes the plate voltage.

The relay 59 controls the circuit supplying power to the motor 13 for driving the feeding mechanism 3. Leads 14 and 14a of this circuit are connected to the opposite terminals of relay 59, line voltage being supplied to the circuit through leads 62. With no current flowing in the coil 58 the relay 59 is normally closed, thus completing the circuit supplying the power to the motor 13. When current flows in coil 58, the relay is held in the open position, breaking the circuit, and thus stopping the operation of the motor 13.

The right hand terminal 44b of the electronic timer 11 is grounded at 63, while the left hand terminal 42b is connected to the negative terminal of the battery 64 which is grounded at 65.

The operation of the embodiment shown in the drawings will now be described. Assuming that the level of solids in the container 1 has fallen below the level which it is desired to maintain, the piston 5 will be able to enter the container space without hinderance. The feeder 3 will be in operation, feeding additional solids into the container to restore the solids level to the predetermined level L.

The periodic reciprocations of the piston 5 are timed by the device 9 which controls solenoid operated valve 8 for periodically admitting compressed air into, and releasing compressed air from, the diaphragm chamber 22. As previously explained, the device 9 controls the operation of the valve 8 by periodically energizing and de-energizing the solenoid coil 18. When the solenoid coil 18 is in the de-energized state, the upper portion 20 of the valve is open to admit compressed air to the diaphragm chamber 22, while the lower portion 21 is closed. Conversely, when coil 18 is energized, the upper portion of the valve 20 is closed, while the lower portion 21 is open, allowing the compressed air in the chamber 22 to vent to the atmosphere.

The period of time between energization and de-energization of coil 18, and likewise the period of time between de-energization and energization of the coil may be set in advance by proper adjustment of the controls 19 on the timing device 9. Thus, for example, the period between energization and de-energization of the coil may be set at 45 seconds, while the period between de-energization and energization of the coil may be set at 10 seconds. With these settings, the piston will make a complete reciprocation every 55 seconds.

The forward thrust of the piston is controlled so that when the level of solids rises above a predetermined point on the piston, the forward thrust of the piston will be no longer sufficient to overcome resistance offered by the pressure of solids against it. For example, as illustrated in Fig. 2, the forward thrust of the piston 5 may be adjusted so that when the solids reach the level L at the center of the piston, the piston will no longer be able to move into the container space. The solid and dotted lines R and $R_2$, respectively, indicate the angle of repose of solids in the container when the level of solids is below and at, respectively, the predetermined level L.

In the embodiment shown, the forward thrust exerted by the piston 5 depends upon a number of factors and can be varied at will by the adjustment of one or more of these factors. Thus, the forward thrust exerted by the piston is directly proportional to the area of diaphragm 23, while it is inversely proportional to the diameter of the piston, and also inversely proportional to the backward thrust exerted by coil spring 32. The proper adjustment of these variables will depend upon the material being handled and whether or not the level of solids is to be controlled between wide or narrow limits.

As long as the level of solids within the container 1 is below the predetermined level L the piston 5 will continue to move back and forth within a fixed period determined by the setting of the cycle timing device 9. As shown in solid lines in Fig. 2, the piston 5 has moved to its most forward position causing the mercury switch 34 to assume the position likewise shown in solid lines. In this position, the mercury pool 34a bridges the gap between terminals 42 and 43L leaving open the gap between terminals 44 and 43R, thus closing the circuit between terminals 42b and 43b of the electronic timer 11. Closing of this circuit charges the variable condenser 47 and at the same time applies a negative voltage on grid 50 of tube 51. The negative bias on the grid 50 renders the tube 51 nonconducting, consequently no current flows through the relay coil 58, the relay therefore remaining in its normally closed position, the motor 13 operating feeder 3 continuing to operate.

When the piston 5 is withdrawn from the container space, assuming the position shown in dotted lines, the mercury switch 34 moves to a position likewise shown in dotted lines. In this position, the mercury pool 34a flows to the opposite end of the switch 34, opening the gap between terminals 42 and 43L and bridging the gap between terminals 43R and 44, thereby completing the circuit across terminals 43b and 44b of the electronic timer 11 while at the same time breaking the circuit across terminals 42b and 43b. Making of the circuit across terminals 43b and 44b throws the condenser 47 and the grid 50 to ground thereby causing the condenser 47 to begin to discharge through resistance 46 at a rate dependent upon the capacitance of the condenser 47 and the value of the resistance 46. After a certain period of delay, the potential of the condenser 47 drops to a value such that the tube 51 becomes conducting, allowing current to flow through the coil 58 thereby breaking the circuit supplying power to the motor 13. Conveniently, the electronic timer 11 is provided with a set of controls, calibrated in intervals of time, for example, seconds, for setting the desired time delay factor between grounding of the condenser 47, when the piston executed its backward stroke, and the energization of relay 59. Thus, a dial 46a may be provided (see Fig. 1) for controlling the value of the resistance 46; while a dial 47a may be provided for controlling the capacitance of condenser 47.

The time delay factor of the electronic timer 11, that is, the interval between the time the grid 50 and condenser 47 are grounded by completing the circuit across terminals 43b and 44b, and the time the tube 51 becomes conductive, is set at a value greater than the time required for the piston to complete one reciprocation. Thus, for example, if it takes the piston 55 seconds to complete one reciprocation, the delay of the electronic timer will be set at a value greater than 55 seconds, for example, 65 seconds. In this way, so long as the piston 5 continues to execute its periodic reciprocations, the tube 51 will remain nonconducting, and the feed mechanism 3 will continue to operate since the condenser 47 will be recharged each time the piston 5 executed its forward stroke, thus preventing the potential on the condenser 47 from dropping to a level at which the tube 51 becomes conducting.

When the solids level rises above the predetermined level L the piston will not be able to execute its forward stroke and the mercury switch 34 will remain in the position shown in the dotted lines, and the circuit across terminals 43b and 44b of the electronic timer will remain completed. After the elapse of the delay interval at which the electronic timer is set, for example, 65 seconds, the tube 51 becomes conducting, opening the relay 59 and cutting off the motor 13. So long as the piston is unable to penetrate into the container space, current will continue to flow in coil 58 of the relay 59, thereby cutting off the feed of additional solids into the container. When the level of solids drops once more below the predetermined level L, the piston will once again begin to execute its periodic reciprocations thereby charging the condenser 47 at frequent enough intervals to prevent the tube 51 from conducting current and thus permitting additional solids to be fed into the container.

The device provided by the present invention is capable of wide application in the handling of particulate solids of all descriptions. Since substantially all the working parts may be located on an outside wall of the container, these are not effected by severe conditions, such as high temperature or a corrosive atmosphere, which may exist within the container itself. A relatively small piston passing through an opening in the wall of the container a relatively short distance into the container is the only working part exposed to the conditions inside the container. By the use of a suitable piston housing and suitable packing for the bushing in which the piston rod slides, a gas-tight seal can be established between the interior of the container and the operating mechanism immediately adjacent the piston housing. Likewise, since the piston penetrates only a short distance into the container, there is little likelihood of its becoming jammed by the solids in the container.

Besides providing an instrument of control which is rugged and dependable in operation, the present invention likewise provides a method and device which is extremely flexible so that with minor adjustments, it can be quickly adapted for use with particulate solids having widely varying characteristics. Thus, for example, it may be used in the handling of materials such as grain and pulverant materials such as cement or pulverized coal as well as with coarse, irregularly shaped particles such as crushed rock. As was previously explained, the thrust exerted by the piston can be adjusted easily in a number of ways to suit the device for materials offering greater or less resistance to the movement of the piston. Likewise, by a few simple adjustments, the solids level may be controlled within wide or narrow limits. For example, by adjusting the delay interval of the electronic timer in respect to the periodic reciprocations of the piston, an extremely sharp control over the solids level may be maintained, or if desired, the level may be controlled within maximum and minimum permissible limits. It is often advantageous not to control the level too closely since this occasions frequent starting and stopping of the motors operating the feed mechanism, causing excessive wear.

It is to be understood that the specific embodiment of the invention described above is intended merely to be illustrative and that the invention is capable of many modifications without departing from the spirit thereof. For example, it is clear that any suitable type of mechanism may be employed for operating the piston in addition to the compressed air system described. The piston, for example, may be operated by a cam, periodically urging the piston in a forward direction. When using a cam to drive the piston directly, the cam is preferably spring loaded so that the amount of thrust exerted by the piston in its forward movement can be controlled.

Similarly, instead of the electronic timing device 11 described, any other timing means for detecting the failure of the piston to execute its timed reciprocations may be employed. Thus, for example, other types of electronic timing circuits than that described may be employed, or if desired a mechanical timing device, operated through suitable arrangement of gear trains may be used.

Although it is most convenient that the timing device be adapted to automatically control the feeding or discharging mechanism, this is not necessary. Instead, the timing device may be utilized to operate a set of signals indicating when the solids level rises above or falls below the predetermined level to be maintained. An operator, observing these signals, could then control the mechanism feeding solids to or discharging solids from the container.

It is likewise apparent that two or more of the devices constructed in accordance with the invention may be employed in conjunction with one another. It will often prove desirable, for example, to use two or more of the controllers in series at separate levels as a safety factor in the event that one of the instruments should fail to function.

It is to be understood that the above description, together with the specific examples and embodiments described, is intended merely to illustrate the invention, and that the invention is not to be limited thereto, nor in any way except by the scope of the appended claims.

We claim:

1. A device for maintaining a predetermined level of particulate solid material in a container comprising a piston located on a sidewall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level, and means including a timer for detecting the time required by said piston to execute a complete reciprocation so as to detect the failure of said piston to execute complete reciprocations at said regular predetermined time intervals.

2. A device for maintaining a predetermined level of particulate solid material in a container comprising a piston located on a sidewall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocation at said regular predetermined intervals only when the level of solids in said container remains below said predetermined level, and means including a timer for detecting the time required by said piston to execute a complete reciprocation so as to detect the failure of said piston to continue to execute complete reciprocations at said regular predetermined intervals, and means controlled by said timer for adjusting the solids level in said container.

3. A device for maintaining a predetermined level of particulate solid material in a container comprising a piston located at an opening in a wall of said container adjacent said predetermined level, continuously operated driving means for urging said piston laterally through said opening into said container at regular predetermined time intervals, means for at least partially withdrawing said piston from said container after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level, and means including a timer for detecting the time required by said piston to execute a complete reciprocation so as to detect the failure of said piston to execute complete reciprocations at said regular predetermined time intervals.

4. A device for maintaining a predetermined level of particulate solid material in a container comprising a piston located on a sidewall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocation at said regular predetermined intervals only when the level of solids in said container remains below said predetermined level, and means including a timer for detecting the time required by said piston to execute a complete reciprocation so as to detect the failure of said piston to continue to execute complete reciprocations at said regular predetermined intervals, means controlled by said timer for adjusting the solids level in said container, said timing means being adapted to effect a change in the operation of said solids level adjusting means when said piston fails to move forwardly into said container after the lapse of a predetermined time interval longer than the time required for said piston to execute a complete reciprocation in an empty vessel.

5. A device for maintaining a predetermined level of particulate solid material in a container comprising a piston located on a sidewall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level, a switch actuated by the movement of said piston, an electrically operated timer controlled by said switch, said timer being adapted to detect the time required by said piston to execute a complete reciprocation so as to detect the failure of said piston to execute complete reciprocations at said regular predetermined time intervals, means controlled by said timer for adjusting the solids level in said container, said timer being adapted to effect a change in the operation of said solids level adjusting means when said piston fails to move forwardly into said container after the lapse of a predetermined time interval longer than the time required for said piston to execute a complete reciprocation in an empty vessel.

6. A device for maintaining a predetermined level of particulate solid material in a container comprising a piston located on a sidewall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level, a switch actuated by the movement of said piston and adapted to open and close an electric circuit on each complete reciprocation of said piston, a timer associated with said electric circuit and adapted to detect the time required by said circuit to open and close so as to detect the failure of said circuit to open and close, in accordance with the movement of said piston, at said regular, predetermined time intervals, and means controlled by said timer for adjusting the solids level in said container.

7. A device for maintaining a predetermined level of particulate solid material in a container comprising a housing fastened to an outside wall of said container opposite an opening in said wall adjacent said predetermined level, a piston in said housing, continuously operated driving means for urging said piston laterally through said opening a relatively short distance into said container at regular predetermined time intervals, means for at least partially withdrawing said piston from said container after each forward stroke thereof, the lateral forward thrust of said piston being adjusted so as to be insufficient to ovecome the resistance offered by said solid material when the solids level in said container rises above said predetermined level, whereby said piston is able to execute complete reciprocations at said regular predetermined intervals only when the level of solids in said container remains below said predetermined level, and means including a timer for detecting the time required by said piston to execute a complete reciprocation so as to detect the failure of said piston to execute complete reciprocations at said regular predetermined time intervals.

8. A device for maintaining a predetermined level of particulate solid material in a container comprising a housing fastened to an outside wall of said container opposite an opening in said wall adjacent said predetermined level, a piston in said housing, continuously operating, gas actuated driving means for urging said piston into said container at regular, predetermined time intervals, the lateral forward thrust of said piston being adjusted so as to be insufficient to overcome the resistance offered by said solid material when the solids level in said container rises above said predetermined level, whereby said piston is able to execute complete reciprocations at said regular, predetermined intervals only when the level of solids in said container remains below said predetermined level, a switch actuated by the movement of said piston, an electrically operated timer controlled by said switch, said timer being adapted to detect the time required by said piston to execute a complete reciprocation so as to detect the failure of said piston to execute complete reciprocations at said regular predetermined time intervals, means controlled by said timer for adjusting the solids level in said container, said timer being adapted to effect a change in the operation of said solids level adjusting means when said piston fails to move forwardly into said container after the lapse of a predetermined time interval longer than the time required for said piston to execute a complete reciprocation in an empty container.

9. A device in accordance with claim 1 in which said piston is driven during its forward stroke by gas under pressure.

10. A device in accordance with claim 2 in which said piston is driven during its forward stroke by gas under pressure.

11. A device in accordance with claim 4 in which said piston is driven during its forward stroke by gas under pressure.

12. A device for maintaining a predetermined level of particulate solid material in a container comprising a piston located on a side wall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level.

13. A device for maintaining a predetermined level of particulate solid material in a container comprising a piston located on a side wall of said container adjacent said predetermined level, continuously operated driving means for urging said piston laterally into said container at regular predetermined time intervals, means for withdrawing said piston after each forward stroke thereof, the lateral forward thrust of said piston being adjusted so as to be insufficient to overcome the resistance offered by said solid material when the solids level in said container rises above said predetermined level, whereby said piston is able to execute complete reciprocations at said regular predetermined intervals only when the level of solids in said container remains below said predetermined level, and a switch actuated by the movement of said piston adapted to open and close an electric circuit on each complete reciprocation of said piston.

JONATHAN D. LANKFORD.
FRED J. TROTTER.
FRED W. TAYLOR.

REFERENCES CITED

The following references are of record in the file of this patent:

UNITED STATES PATENTS

| Number | Name | Date |
|---|---|---|
| 2,299,727 | Blauvelt et al. | Oct. 27, 1942 |
| 2,565,136 | Kretzmer, Jr. | Aug. 21, 1951 |